(12) United States Patent
Pillar (10) Patent No.: US 12,434,808 B2
(45) Date of Patent: Oct. 7, 2025

(54) APPARATUS FOR FORMING AIRFOIL STRUCTURES

(71) Applicant: The Boeing Company, Arlington, VA (US)

(72) Inventor: Greg A. Pillar, Arlington, VA (US)

(73) Assignee: The Boeing Company, Alexandria, VA (US)

( * ) Notice: Subject to any disclaimer, the term of this patent is extended or adjusted under 35 U.S.C. 154(b) by 0 days.

(21) Appl. No.: 18/435,851

(22) Filed: Feb. 7, 2024

(65) Prior Publication Data

US 2025/0249998 A1 Aug. 7, 2025

(51) Int. Cl.
  *B64C 3/34* (2006.01)
  *B64C 3/18* (2006.01)
  *B64C 3/26* (2006.01)

(52) U.S. Cl.
  CPC ............ *B64C 3/34* (2013.01); *B64C 3/185* (2013.01); *B64C 3/187* (2013.01); *B64C 3/26* (2013.01)

(58) Field of Classification Search
  CPC ........... B64C 3/18; B64C 3/182; B64C 3/185; B64C 3/187; B64C 3/34
  See application file for complete search history.

(56) References Cited

U.S. PATENT DOCUMENTS

| 2010/0107513 A1* | 5/2010 | Buchanan | B64C 3/18 52/84 |
| 2021/0316837 A1* | 10/2021 | Hafenrichter | B64C 3/26 |
| 2022/0184904 A1* | 6/2022 | Widdle | F16J 15/14 |

* cited by examiner

*Primary Examiner* — Nicholas McFall
*Assistant Examiner* — Eric Acosta
(74) *Attorney, Agent, or Firm* — Joseph M. Butscher; The Small Patent Law Group LLC (57) ABSTRACT

An apparatus for an internal structure of an airfoil is disclosed. The apparatus may include a support member having a length defined between first and second ends. The support member may include first and second opposing surfaces. An aperture may extending through the first and second opposing surfaces of the support member and a groove may be formed in the first surface between the first and second ends of the support member. The groove may be in fluid communication with the aperture. A structural member may extend substantially perpendicular from the support member. The structural member may include first and second opposing sides. An injection port may extend through the first and second opposing sides of the structural member. A protrusion may extend from the structural member. The protrusion may include a passageway in fluid communication with the injection port and the aperture.

20 Claims, 5 Drawing Sheets

APPARATUS FOR FORMING AIRFOIL STRUCTURES

FIELD

The present disclosure relates generally to structures or components of airfoils and, more particularly, to apparatus to enable sealing of airfoil containment regions, such as fuel containment regions within a wing of an aircraft.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Composite structures are used in a wide variety of applications, including in the manufacture of airplanes, spacecraft, and other vehicles and structures, due to their high strength-to-weight ratios, corrosion resistance, and other favorable properties. In the aerospace industry, composite structures are used in increasing quantities, for example, to form wings, tail sections, fuselage, and other components. For example, composite aircraft wings may utilize upper and lower outer composite wing skin panels, commonly referred to as "skins," that are mechanically attached or bonded to an internal frame (e.g., a wing box). The internal frame may typically include reinforcing structures such as spars, ribs, and/or stringers to improve the strength and stability of the skins. The internal frame may also include one or more combustible regions or atmospheres. The combustible regions may include fuel tanks or fuel cells, which may be contained between spars of the internal frame of the aircraft wing.

However, composite structures as well as metal structures in aircraft may not readily conduct away electrical currents and electromagnetic forces generated by sparking and/or arcing resulting from transient events, such as lightning strikes. Therefore, aircraft wing structures may be equipped with protection against electromagnetic effects (EME) from transient events. For example, conductive media may be provided on a surface to dissipate current away from composite structures, metal structures, and/or fastener systems. In addition, gaps between fastener parts (e.g., two-piece fasteners) and gaps between fastener parts and structural members may be filled with dielectric sealant that provides EME protection. Even if some current is not diverted, the sealant may prevent arcing and sparking across the gaps.

Current protection architectures and sealing techniques for aircraft wings may be complex and expensive. As an example, applying sealant to the wings usually requires extensive manufacturing labor and is performed in confined spaces with limited access. For example, the process of manufacturing the wing typically involves match drilling the spars and the skins, removal of the skins from the spars for surface finishing, and realignment of the skins to the spars to close out the wing. Access to the now closed out wing for installation of the fastener parts, installation of other interior systems, and injection of the sealant is gained through access holes formed in the lower outer wing skin, which may be inefficient and potentially dangerous for the laborer. For example, it may be difficult to access the interior of combustible regions or fuel barrier regions of the wings, such as fuel tanks where fuel is contained, to apply sealant at boundary lines between the combustible regions and other regions. Further, some sections of the wing (e.g., a thin wing structure) may not provide access to boundaries of containment or barrier regions. Accordingly, it would be desirable if barrier or closure apparatus could be provided which alleviate the drawbacks of conventional sealing techniques for aircraft structures, such as wing fuel tanks, and allow sealant to be readily applied and serviced at the boundaries of containment or barrier regions.

SUMMARY

The present application is directed to embodiments relating to apparatus configured to enable seals to be created for containment areas of airfoils, such as fuel containment regions in a wing of an aircraft. The embodiments may improve the sealing arrangement for the containment areas of airfoils and may reduce the time for applying and servicing the sealant at the boundaries of the containment areas. Further, the embodiments may reduce or eliminate sealant injection ports defined in outer skins or panels of airfoils.

In one aspect, an apparatus for an internal structure of an airfoil is disclosed. The apparatus may include a support member having a length defined between first and second ends. The support member may include first and second opposing surfaces. An aperture may extending through the first and second opposing surfaces of the support member and a groove may be formed in the first surface between the first and second ends of the support member. The groove may be in fluid communication with the aperture. A structural member may extend substantially perpendicular from the support member. The structural member may include first and second opposing sides. An injection port may extend through the first and second opposing sides of the structural member. A protrusion may extend from the structural member. The protrusion may include a passageway in fluid communication with the injection port and the aperture.

In another aspect, an aircraft wing box structure is disclosed. The aircraft wing box structure may include a first wing spar comprising a first support member, a second support member, and a structural member extending between the first support member and the second support member. The first wing spar may include a passageway in communication with an injection port and an aperture. The injection port may be disposed through the structural member and the aperture may be disposed through the first support member. The aircraft wing box structure may also include a second wing spar and one or more ribs attached substantially perpendicular to and between the first and second wing spars.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The figures and the following description illustrate specific exemplary embodiments. It will be appreciated that those skilled in the art will be able to devise various arrangements that, although not explicitly shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular embodiments are described herein with reference to the drawings. In the description, common features may be designated by common reference numbers throughout the drawings. In some drawings, multiple instances of a particular type of feature may be used. Although these features are physically and/or logically distinct, the same reference number may be used for each, and the different instances are distinguished by addition of a letter to the reference number.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present application is directed to embodiments relating to apparatus configured to enable seals to be created for containment areas of airfoils, such as fuel containment regions in a wing of an aircraft. The embodiments may improve the sealing arrangement for containment areas of airfoils and may reduce the time for applying and servicing sealant at the boundaries of the containment areas. Further, the embodiments may reduce or eliminate sealant injection ports defined in outer skins or panels of airfoils.

Figure 1:
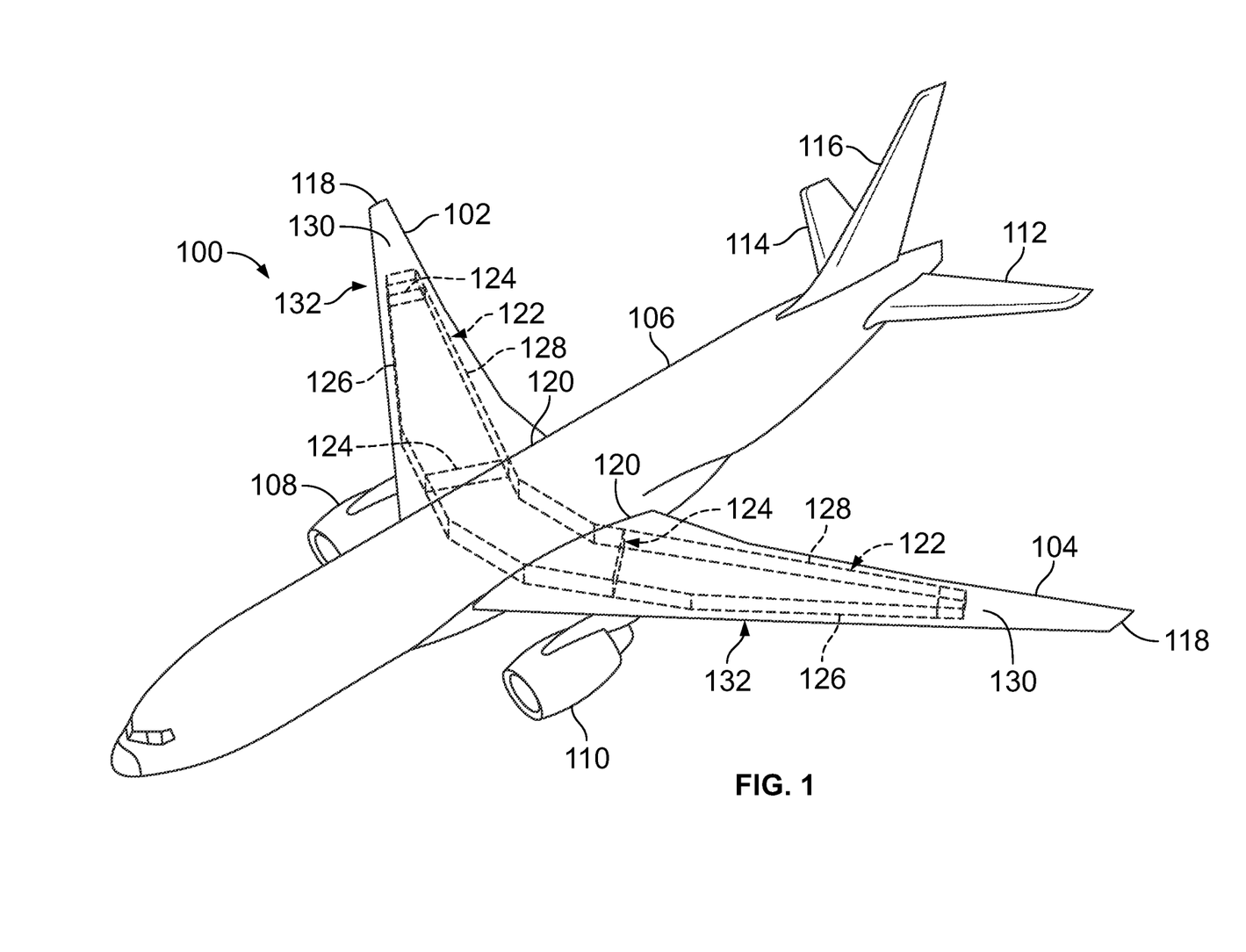
FIG. 1 is an illustration of an exemplary aircraft.

Referring now to the Figures, FIG. 1 is a schematic illustration of an exemplary aircraft 100 in which embodiments of the apparatus disclosed herein can be implemented. As shown in FIG. 1, the aircraft 100 has wings 102 and 104 attached to a body 106 (e.g., a fuselage). The aircraft 100 also includes wing mounted engines 108 and 110 and a tail section that includes horizontal stabilizers 112 and 114 and a vertical stabilizer 116. The wings 102 and 104, horizontal stabilizers 112 and 114, and/or vertical stabilizer 116 may take the form of an airfoil (e.g., includes an airfoil-shaped body in cross-section).

As shown in FIG. 1, each wing 102 and 104 of the aircraft 100 includes a tip end 118, a root end 120, and a wing box 122 (e.g., an internal frame). Each wing box 122 may include one or more ribs 124 extending between a front spar 126 and a rear spar 128. An upper skin panel 130 and a lower skin panel 132 are attached to the front spar 126, the rear spar 128, and the ribs 124 of each wing box 122 to form an enclosed structure. The wing box 122 of each wing 102 and 104 can carry a number of important aircraft systems including, for example, one or more fuel containment regions, engine supports, control surface actuation systems, landing gear, etc. The fuel containment regions may comprise fuel tanks, fuel cells, etc. Although the aircraft 100 shown in FIG. 1 is generally representative of a commercial passenger aircraft, the embodiments of the apparatus disclosed herein may be used with other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, or other suitable structures.

Figure 2:
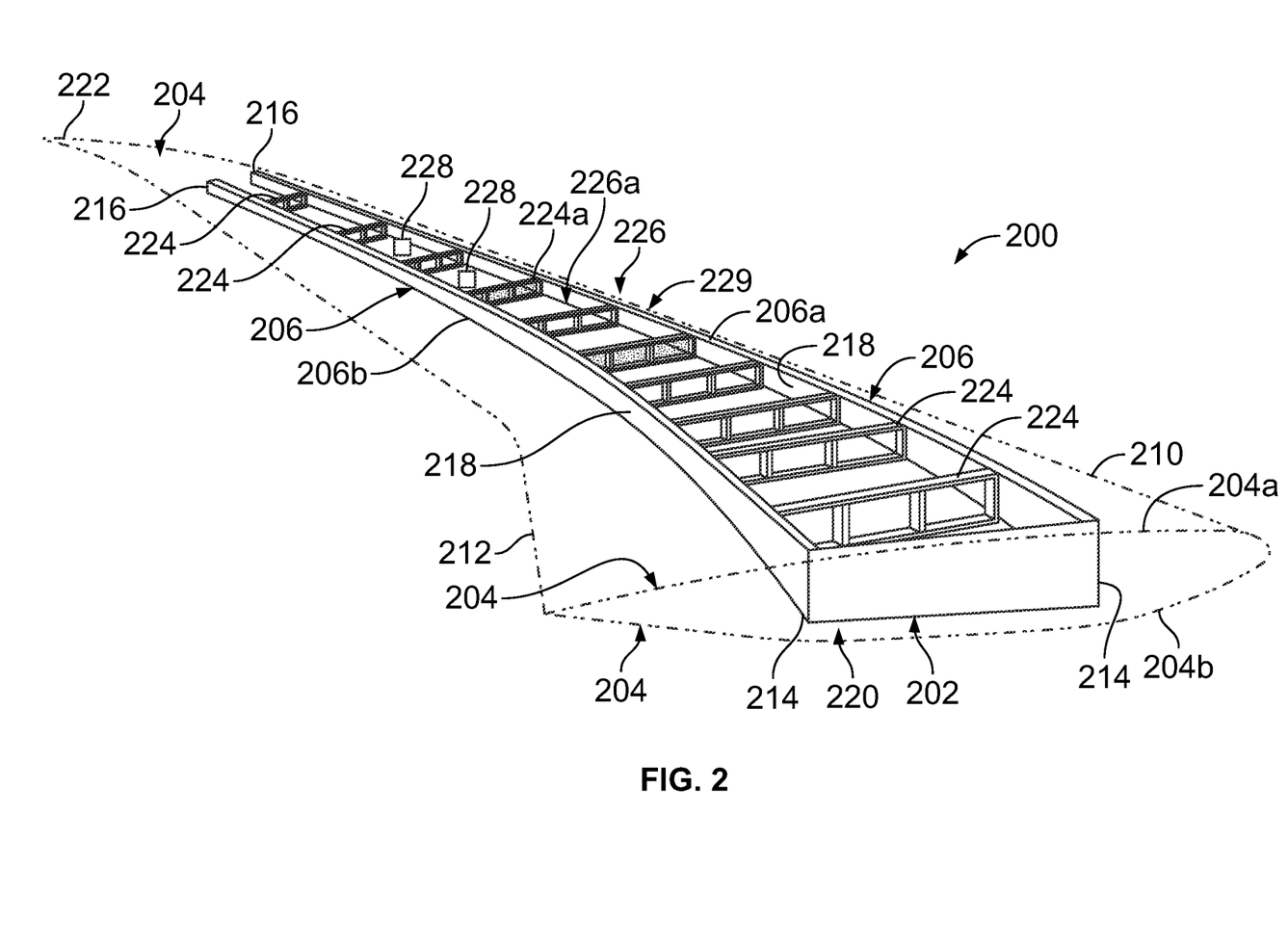
FIG. 2 is a perspective cross-sectional view of a wing having skin panels attached to a wing box in accordance with an exemplary embodiment.
Figure 3:
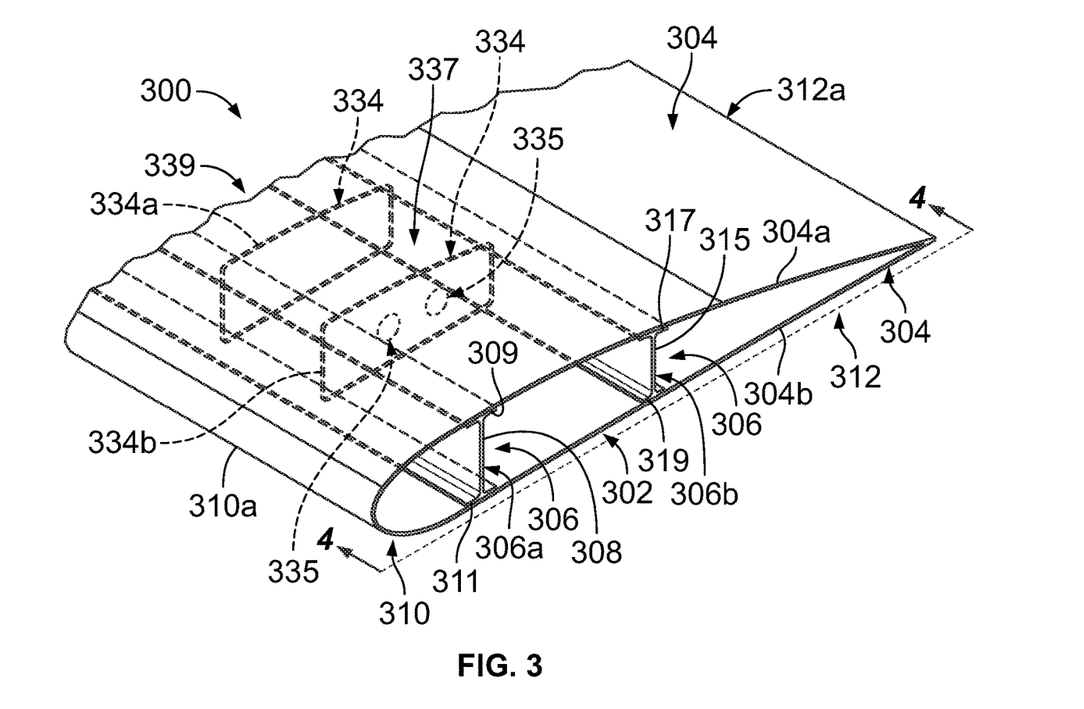
FIG. 3 is an illustration of a portion of a wing in accordance with an exemplary embodiment.

FIG. 2 is a perspective view of an exemplary embodiment of a wing 200 of an aircraft, such as the wing 104 of the aircraft 100 of FIG. 1. In the illustrated embodiment, the wing 200 includes or contains a wing box 202 and outer wing skin panels 204, generally referred to as skins. The outer wing skin panels 204 of the wing 102 may include one or more stiffened upper or top outer wing skin panels, generally referred to as an upper skin 204a, and one or more stiffened lower or bottom outer wing skin panels, generally referred to as a lower skin 204b. The upper skin 204a and lower skin 204b cover or sandwich the wing box 202. In FIG. 3, the upper skin 204a is depicted as being transparent in order to better illustrate the wing box 202, as shown with broken lines.

The wing box 202 of the wing 200 forms an internal frame or substructure of the wing 200. The wing box 202 may include one or more spars 206. The spars 206 provide strength to the wing 200 and may carry axial forces and bending moments. As shown in FIG. 2, the wing box 202 includes a front spar 206a and a rear spar 206b. The front spar 206a is positioned lengthwise along a leading edge 210 of the wing 200, and the rear spar 206b is positioned lengthwise along a trailing edge 212 of the wing 200. Each spar 206 includes a first end 214, a longitudinally opposed second end 216, and an elongated body 218. The body 218 of each spar 206 may be a continuous (e.g., unitary) body or segmented. The wing box 202 may also include one or more intermediate spars (not illustrated). The intermediate spars may be positioned lengthwise (e.g., at intermediate locations) between the front spar 206a and the rear spar 206b.

Each of the spars 206 may be attached to a structure (e.g., fuselage) of an aircraft, such as the body 106 of the aircraft 100 of FIG. 1. For example, the first end 214 of each of the spars 206 may be configured for attachment to a fuselage. In other embodiments, the spars 206 may be attached to other suitable structures of an aircraft. The spars 206 may extend from the fuselage in a lengthwise direction from a root end 220 toward a tip end 222 of the wing 200. In the illustrated embodiment, the second end 216 of each of the spars 206 extends toward the tip end 222 of the wing 200 and/or terminates proximate (e.g., at or near) the tip end 222.

The wing box 202 of the wing 200 may also include one or more ribs 224. The ribs 224 may stabilize and provide support to the wing 200. For example, the ribs 224 may transfer load among the spars 206 and the upper skin 204a and the lower skin 204b. In the illustrated embodiment, the ribs 224 are attached substantially perpendicular to and between the front and rear spars 206a and 206b. The upper and lower skins 204a and 204b may be positioned in contact with a lower surface of the ribs 224 and an upper surface of the ribs 224 to facilitate interconnection there-between, thereby increasing the structural rigidity of the wing 200. The wing box 202 may include one or more stringers (not shown) coupled between the ribs 224 and to the upper and/or lower skins 204a and 204b.

The spars 206 and ribs 224 may be connected together, for example, with mechanical fasteners, to form the wing box 202. In some embodiments, the spars 206 and ribs 224 may be bonded together, for example, with an adhesive, to form the wing box 202. In other embodiments, the spars 206 and ribs 224 may be both adhesively bonded and mechanically connected together to form the wing box 202. While the illustrative embodiment of the wing 200 shown in FIG. 2 depicts the wing box 202 as being constructed from spars 206 and ribs 224 (e.g., the wing box 202 includes interconnected spars 206 and ribs 224), those skilled in the art will recognize that in other embodiments of the wing box 202 may be a multi-spar design formed from only the spars 206 (e.g., the wing box 202 includes interconnected spars 206).

The spars 206 and the ribs 224 may be made (e.g., formed) of a composite material. For example, the spars 206 and ribs 224 may be made of a fiber-reinforced polymer, a fiber-reinforced plastic that includes a polymer matrix reinforced with fibers, such as carbon fiber reinforced polymer (CFRP), a glass fiber reinforced polymer (GFRP) and the like. In some embodiments, the spars 206 and ribs 224 may be made of metal, such as aluminum, or a metal alloy, such as aluminum alloy. In other embodiments, the spars 206 and ribs 224 may be made of any other suitable material or combination of materials.

The wing box 202 of the wing 200 may also include one or more fuel containment regions 226 and one or more interior systems 228. In some embodiments, one or more of the ribs 224 may separate fuel containment regions 226 within the wing 200. The fuel containment regions 226 may include one or more fuel tanks 229. In other embodiments, the fuel containment regions 226 may include fuel cells or other structures and/or devices. Each fuel containment region 226 may have fuel containment boundaries that form the perimeter of the fuel containment region. In some embodiments, portions of one or more of the spars 206 and/or ribs 224 may form a structural wall of at least one of the fuel containment regions 226. For example, a portion of the front spar 206a, a portion of the rear spar 206b, the rib 224a, and the rib 224b may form the structural walls of a fuel containment region 226a. Although the fuel containment region 226a shown in FIG. 3 has a four-sided, generally rectangular configuration, in other examples, the fuel containment region may be formed in other suitable configurations.

The upper skin 204a and the lower skin 204b of the wing 200 may cover or sandwich the one or more fuel containment regions 226, spars 206, and ribs 224 between the upper skin 204a and the lower skin 204b. The skins 204 may be connected to the spars 206 by mechanical fasteners to form the wing 200. In some embodiments, the skins 204 may be bonded to the spars 206 with an adhesive to form the wing 200. In other examples, the skins 204 may be both adhesively bonded and mechanically connected to the spars 206 to form the wing 200. The skins 204 (e.g., the upper skin 204a and/or the lower skin 204b) may be made of a composite material. As an example, the skins 204 may be made of a fiber-reinforced polymer that includes a polymer matrix reinforced with fibers, such as a carbon fiber reinforced polymer CFRP, GFRP and the like. As another example, the skins 204 may be made of metal, such as aluminum, or a metal alloy, such as an aluminum alloy. In other embodiments, the skins 204 may be made of another suitable material or combination of materials.

Figure 4:
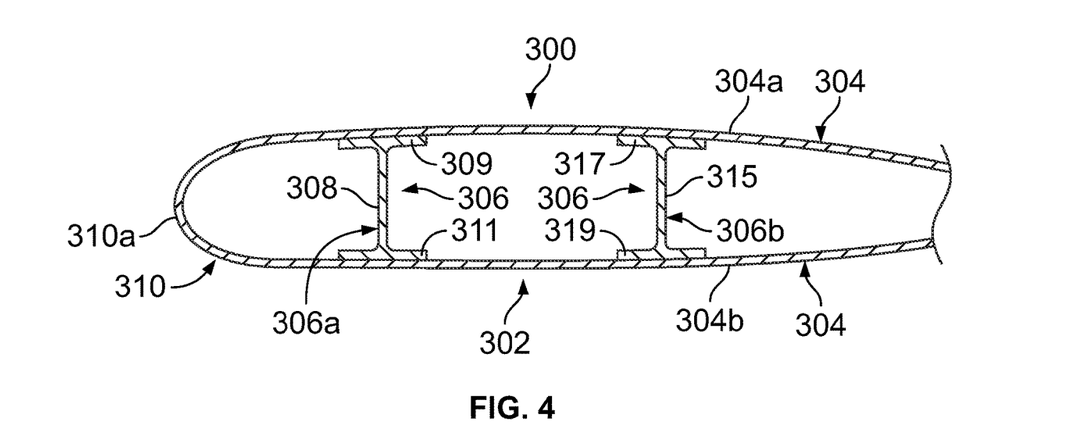
FIG. 4 is a cross-sectional view of the portion of the wing of taken about line 4-4 of FIG. 3.

With reference now to FIG. 3, a perspective view of a section or portion of a wing 300 is depicted in accordance with an exemplary embodiment. FIG. 4 shows a cross-sectional view of the section of the wing 300 taken about line 4-4 of FIG. 3. The section of the wing 300 may include a wing box 302 forming part of a wing of an aircraft, such as the wing 200 of FIG. 2 or the wing 104 of the aircraft 100 of FIG. 1. The section of the wing 300 may include outer wing skin panels 304, generally referred to as skins, and a plurality of spars 306. As shown, a leading edge assembly 310 having a leading edge 310a may be attached to the front of the wing box 302, and a trailing edge assembly 312 having a trailing edge 312a may be attached to the rear of the wing box 302.

The outer wing skin panels 304 of the wing 200 include an upper or top skin 304a and a lower or bottom skin 304b. The upper skin 304a and lower skin 304b may cover the wing box 302 and may be attached to the spars 306. In the illustrated embodiment, the wing box 302 includes at least a front or forward spar 306a and a rear or aft spar 306b. The front and rear spars 306a and 306b are generally I-shaped in cross section, however, depending on the application, the front and/or rear spars 306a and 306b may be in the form of other cross-sectional shapes, such as, without limitation, "C", "J", "Z" and "T" structures. The front spar 306a may include a spar web 308 and upper and lower support members or caps 309 and 311 that are respectively integrated into the opposite top and bottom ends of the spar web 308 of the front spar 306a. Similarly, the rear spar 306b includes a spar web 315 and upper and lower spar support members or caps 317 and 319 that are integrated into the opposite top and bottom ends of the spar web 315 of the rear spar 306b. The upper support members or caps 309 and 317 of the spars 306 are generally aligned with and attached to the upper skin 304a, and the lower support members or caps 311 and 319 of the spars 306 are generally aligned with and attached to the lower wing skin panel 304b. Each of the spar support members or caps 309, 311, 317, and 319 may comprise a single support member or a double support member that may be a reinforced composite resin laminate, depending on the application and particular configuration of the wing box 302. The spars 306 are examples of internal structures that may incorporate embodiments of the apparatus disclosed herein as further described below.

The wing box 302 of the wing 300 may also include one or more ribs 334. The ribs 334 may be adapted to provide structural rigidity to the wing 300. The ribs 334 may be spaced apart in the span-wise direction of the wing box 302 and attached to the spars 306 and/or to the upper and lower skins 304a and 304b, respectively. As shown in FIG. 3, each of the ribs 334 is coupled between the front spar 306a and rear spar 306b. The ribs 334 may include openings 335 therein to reduce the weight of the ribs 334 and to facilitate fluid communication through the ribs 334 within a fuel containing area, such as a fuel tank.

In one embodiment, the rib 334a may be a center rib that divides a first fuel tank 337 from a second fuel tank 339. In such an embodiment, the rib 334a does not include openings, thereby establishing a fuel flow boundary between the two fuel tanks. The first fuel tank 337 may include the rib 334b therein, while the second fuel tank 339 may be disposed on a second side of the rib 334a opposite the rib 334b. The second fuel tank 339 may also include ribs therein. In another embodiment, the rib 334a may define an outer boundary of a fuel tank. In such an example, an additional fuel may not be located on a second side of the rib 334a opposite the rib 334b. The ribs 334 are examples of internal structures that incorporate embodiments of the apparatus disclosed herein as further described below.

The spars 306, ribs 334, and skins 304 may be formed from the same or different materials. For example, aluminum, titanium, or composite materials may be used. Composite materials may include, for example, graphite combined with epoxy resin, titanium, and other graphite composites. Carbon fiber reinforced polymer (CFRP) is another example of a composite that may be used. In some embodiments, the spars 306 and the skins 304 may be of a composite sandwich panel construction.

Figure 5:
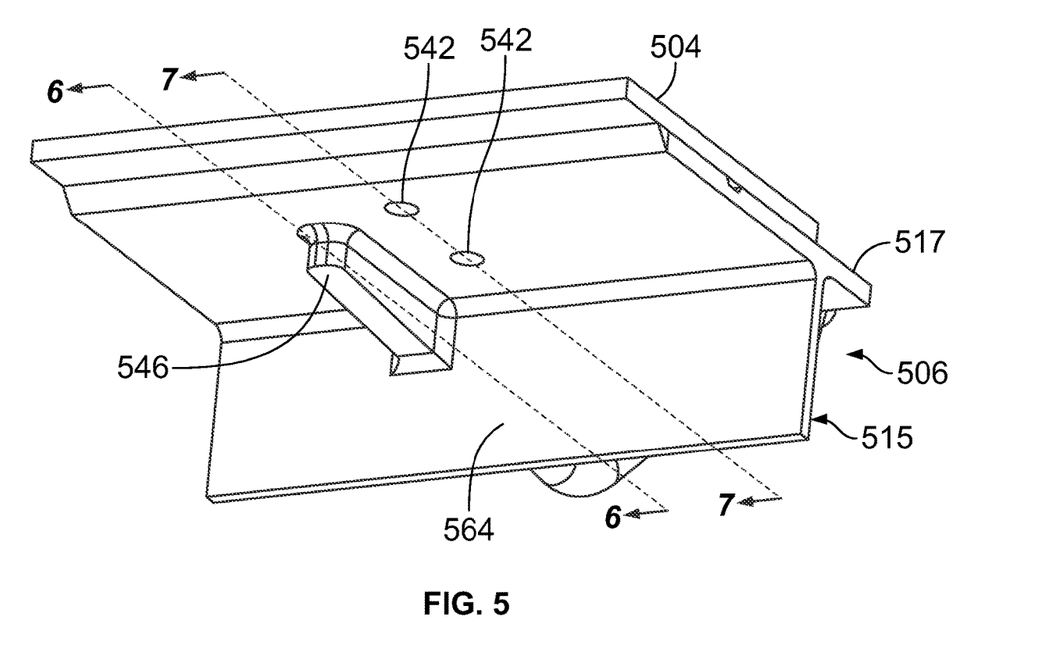
FIG. 5 is a perspective view of a portion of an internal wing structure in accordance with an exemplary embodiment.
Figure 6:
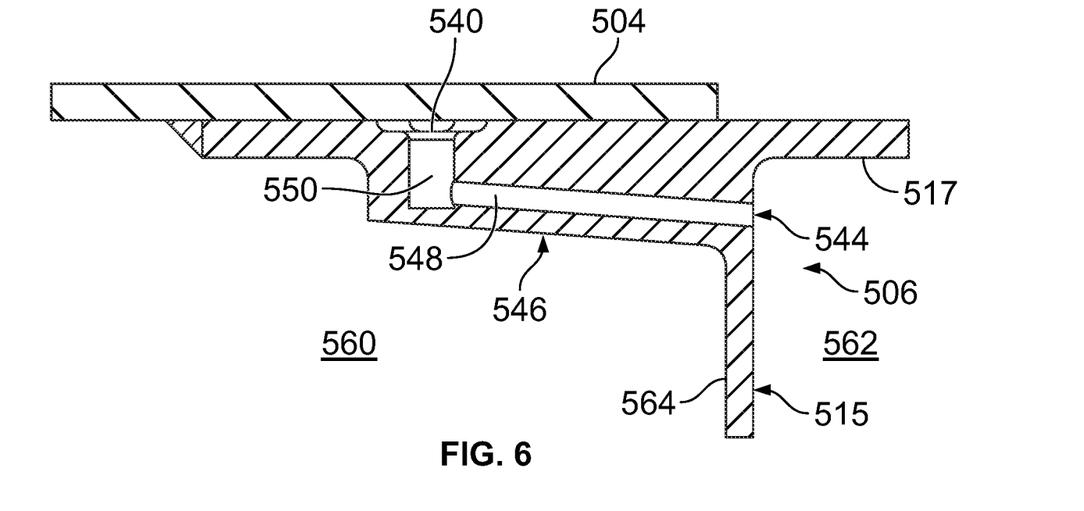
FIG. 6 is a cross-sectional view of the portion of the internal wing structure taken about line 6-6 of FIG. 5.
Figure 7:
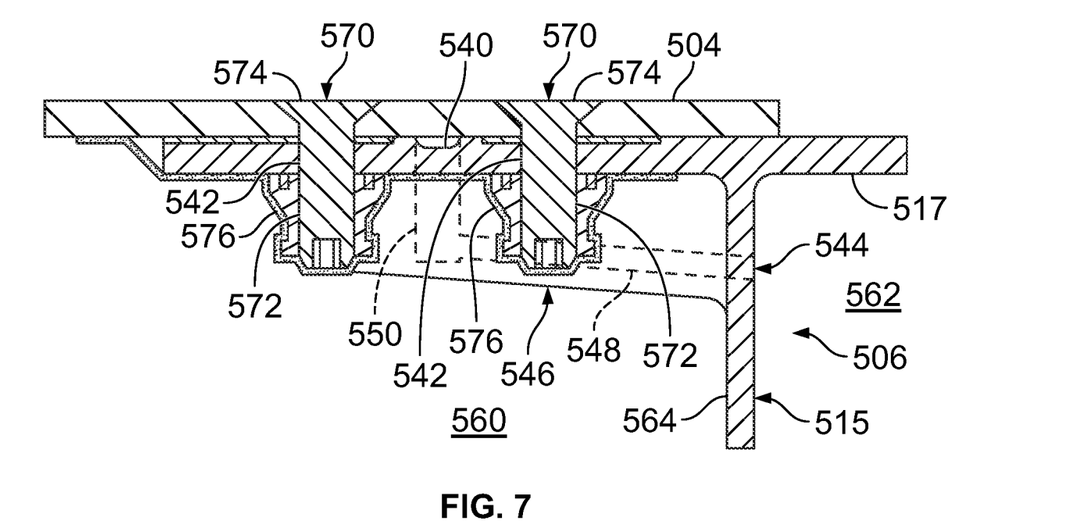
FIG. 7 is a cross sectional view of the portion of the internal wing structure taken about line 7-7 of FIG. 5.

With reference now to FIGS. 5-7, a portion of a structural member or component 506 of a wing box of an aircraft is illustrated. The structural member 506 may comprise a spar, such as the rear spar 306b of the wing box 302 of FIG. 3. In other embodiments, the structural member 506 may comprise a rib of a wing box, such as a rib 334a of the wing box 302 of FIG. 3. In the illustrative embodiment, the structural member 506 (e.g., spar) includes a web 515, a top support member or cap 517, and a bottom support member or cap (not shown). The top support member 517 of the structural member 506 is disposed against a lower surface of an upper skin 504 of a wing, such as the upper skin 304a of the wing 300 of FIG. 3.

As shown in FIGS. 5 and 7, the top support member 517 of the structural member 506 may also include one or more fastener openings or holes 542 (two being shown) to receive fasteners as further described below. The particular dimensions of the openings 542 may vary depending upon implementation. As shown in FIGS. 6 and 7, the top support member 517 of the structural member 506 may also include a channel or groove 540 formed in an upper surface of the top support member 517. The channel 540 extends along the length of the structural member 506 (e.g., spar) between opposing ends of the structural member 506. The channel 540 may have generally a semicircular cross-sectional shape formed in the upper surface of the top support member 517. However, the channel 540 may have other cross-sectional shapes, depending upon the application, With reference to FIG. 6, the structural member 506 (e.g., spar or rib) of the wing box includes an injection port 544 and a protrusion 546 extending from the web 515 and the top support member 517 of the structural member 506. The protrusion 546 includes a passageway 548 and a discharge port or aperture 550. The passageway 548 extends from the injection port 544 to the discharge port 550. Thus, the discharge port 550 is in fluid communication with the injection port 544.

The injection port 544 of the structural member 506 is located or defined in the structural member 506 instead of located at the airflow/exterior surface of an airfoil, such as an aircraft wing. As such, injection ports defined in outer skins or panels of airfoils may be reduced or eliminated. A tool (not shown) may be used to inject a sealant into the injection port 544. The sealant may comprise a non-curing silicone sealant or any other suitable sealant. The injection port 544 may include a fitting with a check valve feature to prevent backflow of sealant injected into the injection port 544. When the sealant is injected into the injection port 544, the sealant may travel through the passageway 548 and into the discharge port 550. From the discharge port 550, the sealant may enter and flow into the channel or groove 540 in the upper surface of the top support member 517 of the structural member 506.

As shown in FIGS. 6 and 7, the structural member 506 may divide a wet area 560 (e.g., an area containing fuel) from a dry area 562 (e.g., an area where no fuel is contained). In some embodiments, the structural member 506 (e.g., a spar or rib) may define a portion of a boundary of a combustible region, such as a fuel tank. As such, a surface 564 of the structural member 506 may be exposed to fuel and/or fuel vapors.

With reference to FIG. 7, one or more fasteners 570 (two being shown) may be used to fasten or attach the structural member 506 (e.g., spar or rib) of the wing box to the upper skin 504 of a wing. Each fastener 570 includes a shank 572 and a head 574 disposed at an end of the shank 572. The shank 572 of each fastener 570 includes an exterior thread covering a portion of the shank 572. The threaded portion of each shank 572 is configured to threadingly connect to a collar or dome nut 576 in order to fasten the fasteners 570 and the collars 576 together. The collars 576 may completely enclose the shanks 572 of the fasteners 570 to protect the fastening interface from contamination, such as fuel stored within the fuel containment region. When access is provided to the collars 576, the collars 576 may be covered with an overcoat, such as a brush/spray seal, Although the disclosed embodiments have been generally described and illustrated in conjunction with an aircraft, the embodiments may be used in a variety of applications, such as the automotive, marine, electronics, power generation, and computer industries. As such, the foregoing description of the disclosed apparatus in an aircraft was for purposes of illustration and example and not of limitation since the systems and methods described above are equally applicable in many different industries.

Further, the description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While apparatus has been described with reference to certain examples, it will be understood by those skilled in the art that various changes can be made and equivalents can be substituted without departing from the scope of the claims. Therefore, it is intended that the present apparatus not be limited to the particular examples disclosed, but that the disclosed apparatus include all embodiments falling within the scope of the appended claims.

What is claimed is:

1. An apparatus for an internal structure of an airfoil comprising:
    a support member having a length defined between first and second ends, wherein the support member includes first and second opposing surfaces, and one or more fastener holes formed through the first and second opposing surfaces, wherein the one or more fastener holes are configured to receive one or more fasteners;
    an aperture extending through the first and second opposing surfaces of the support member, wherein the aperture is outside of the one or more fastener holes, and wherein the aperture within one or both of the first and second opposing surfaces is in a first plane;
    a groove formed in the first surface between the first and second ends of the support member, wherein the groove is outside of the one or more fastener holes, and wherein the groove is in fluid communication with the aperture;
    a structural member extending perpendicular from the support member, wherein the structural member includes first and second opposing sides;
    an injection port extending through the first and second opposing sides of the structural member, wherein the injection port is outside of the one or more fastener holes, wherein the injection port within one or both of the first and second opposing sides is in a second plane that is perpendicular to the first plane; and
    a protrusion extending from the structural member, wherein the protrusion includes a passageway in fluid communication with the injection port and the aperture, and wherein the protrusion is outside of the one or more fastener holes.

2. The apparatus of claim 1, wherein the apparatus comprises a spar, a rib, or a stringer.

3. The apparatus of claim 1, wherein the support member is configured to contact a skin panel.

4. The apparatus of claim 1, wherein the first or second opposing side of the structural member faces a fuel containment region or a fluid tight chamber.

5. The apparatus of claim 1, wherein the groove is configured to receive a sealant through the aperture for forming a sealing arrangement.

6. The apparatus of claim 1, further comprising a skin panel coupled to the support member.

7. The apparatus of claim 1, further comprising a non-curing sealant disposed in the groove and a skin panel coupled to the support member, wherein the non-curing sealant contacts the skin panel.

8. The apparatus of claim 1, wherein the support member and the structural member are constructed from metal, composite materials, or a combination thereof.

9. The apparatus of claim 1, wherein the support member comprises a first support member, and further comprising a second support member coupled to the structural member, wherein the second support member is positioned perpendicular to the structural member and parallel to the first support member, and wherein the second support member has a length defined between first and second ends.

10. The apparatus of claim 9, wherein the apparatus has an I-shaped cross-section.

11. The apparatus of claim 9, wherein the aperture comprises a first aperture, wherein the groove comprises a first groove, wherein the injection port comprises a first injection port, wherein the second support member includes first and second opposing surfaces, and further comprising:
    a second aperture extending through the first and second opposing surfaces of the second support member;
    a second groove formed in the first surface of the second support member, wherein the second groove is in fluid communication with the second aperture; and
    a second injection port extending through the first and second sides of the structural member.

12. The apparatus of claim 11, further comprising a sealant passageway in fluid communication with the second aperture and the second injection port.

13. The apparatus of claim 1, further comprising a protrusion extending from the structural member, wherein the protrusion includes the passageway.

14. An aircraft wing box structure comprising:
    a first wing spar comprising a first support member, a second support member, and a structural member extending between the first support member and the second support member, wherein the first wing spar includes:
one or more fastener holes configured to receive one or more fasteners; and
a passageway in communication with an injection port in a first plane and an aperture in a second plane that is perpendicular to the first plane, wherein the passageway, the injection port, and the aperture are outside of the one or more fastener holes, wherein the injection port is disposed through the structural member, and wherein the aperture is disposed through the first support member;
a second wing spar; and
one or more ribs attached perpendicular to and between the first and second wing spars.

15. The aircraft wing box structure of claim 14, wherein first support member includes a first and second opposing surfaces, and further comprising a groove defined in the first surface, wherein the groove is in fluid communication with the aperture.

16. The aircraft wing box structure of claim 14, further comprising a protrusion extending from the structural member, wherein the protrusion includes the passageway.

17. The aircraft wing box structure of claim 14, further comprising a skin panel coupled to the first support member.

18. The aircraft wing box structure of claim 17, wherein the skin panel comprises a first skin panel, and further comprising a second skin panel coupled to the second support member of the first wing spar and a fuel containment region defined between the first skin panel and the second skin panel.

19. The aircraft wing box structure of claim 14, wherein the injection port comprises a first injection port, wherein the aperture comprises a first aperture, wherein the second wing spar comprises a first support member, a second support member, and a structural member extending between the first support member and the second support member, wherein the second wing spar includes a passageway in fluid communication with a second injection port and a second aperture, wherein the second injection port is disposed through the structural member of the second wing spar, and wherein the second aperture is disposed through the first support member of the second wing spar.

20. The aircraft wing box structure of claim 14, wherein the injection port comprises a first injection port, wherein the aperture comprises a first aperture, wherein a first rib of the one or more ribs comprises a first end, a second end, and a structural or web member extending between the first and second ends, and wherein the first rib includes a passageway in fluid communication with a second injection port and a second aperture, wherein the second injection port is disposed in the first rib, and wherein the second aperture is disposed through the first end of the first rib.

* * * * *